Oct. 9, 1951 T. M. FASON 2,570,224
TUBE COUPLING
Filed Jan. 24, 1949
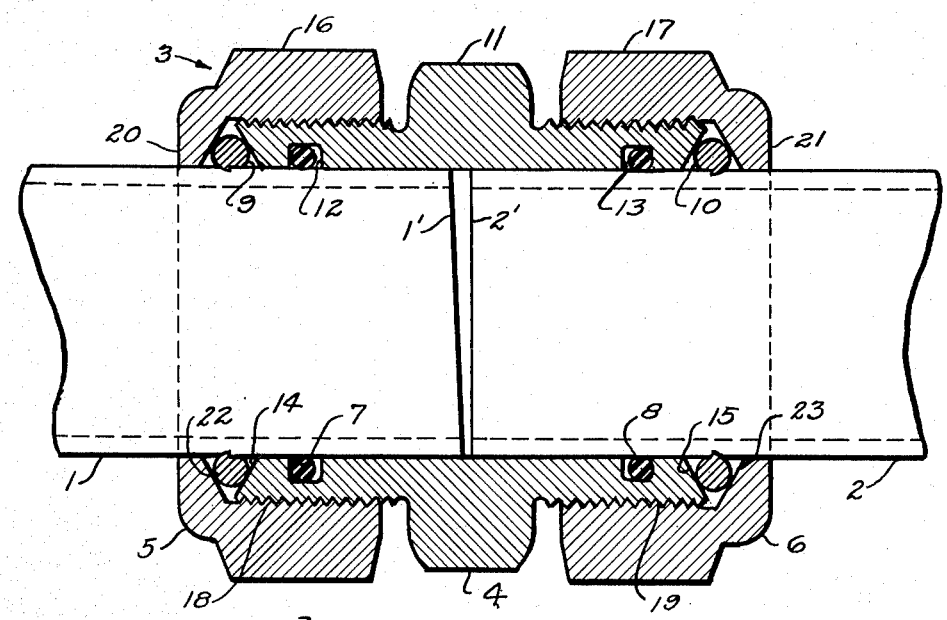
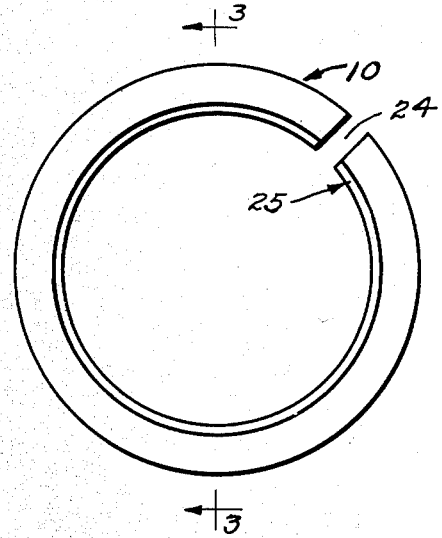
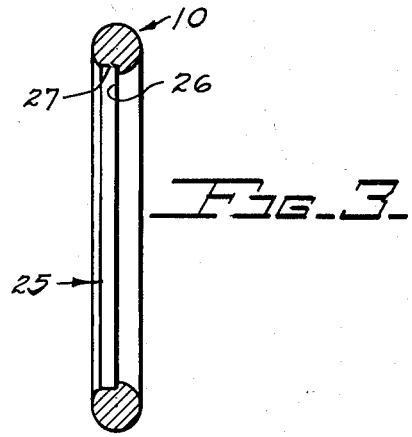
INVENTOR.
THOMAS M. FASON Patented Oct. 9, 1951

2,570,224

UNITED STATES PATENT OFFICE 2,570,224

TUBE COUPLING

Thomas M. Fason, Knoxville, Tenn.

Application January 24, 1949, Serial No. 72,466

3 Claims. (Cl. 285—122)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a tube coupling device for connecting high-pressure fluid lines without threading the ends thereof.

The primary object of the invention is to provide a connector or coupling for tubular members including separate means for effecting a secure mechanical connection and for effecting a fluid-tight joint.

A further object of the invention is to provide a coupling for tubes or pipes having unthreaded end portions and including a mechanical anchoring means of annular form adapted to form a positive connection by virtue of a sharp annular edge portion which embeds itself in the contiguous tube wall when properly installed on the tube.

Another object of the invention is to provide a tube coupling or securing device including a mechanical anchoring means of annular form having tube gripping portions particularly adapted to prevent withdrawal of a tube end under the action of large fluid pressures therein.

Another object of the invention is to so improve the mechanical gripping action of tube coupling devices as to extend the field of usefulness of such devices.

The above and other objects of the invention will become apparent upon reading the following detailed description in conjunction with the drawing, in which:

Fig. 1 is a longitudinal cross sectional view taken through a tube coupling made according to the present invention and showing two adjacent tubes coupled thereby.

Fig. 2 is an enlarged plan view of the split ring providing the essential element of the mechanical anchoring means for the tube or tubes associated with the present coupling device.

Fig. 3 is a cross sectional view taken on the line 3—3 of Fig. 2.

For a description of the present tube coupling or connecting device reference is first made to Fig. 1 which shows a preferred embodiment of the invention. It will be noted that two tubes 1 and 2 of uniform diameter fit nicely within the coupling device 3 with the adjacent tube ends 1' and 2' located at or near the center of the coupling device 3. The adjacent end portions of the coupled tubes may be cut off before installation with a hacksaw and the cuts may either be on the bias or perfectly square, as exemplified by the ends 1' and 2' respectively. However a necessary precaution is that no burrs should remain on the cut edges, since these irregularities might cause serious abrasion of the rubber or resilient sealing rings upon insertion of the tubes into the coupling device.

The coupling device itself comprises the central tubular coupling element 4, similar nut members 5 and 6, a pair of rubber sealing rings or O-rings 7 and 8 and a pair of split metallic rings 9 and 10 for anchoring the tubes in place as shown. The tubular element 4 is provided at the middle thereof with a non-circular nut formation 11 adapted to be gripped by a wrench or spanner for preventing rotation thereof. Near each end the inside surface of the member 4 is provided with internal grooves 12 and 13 of generally rectangular cross sectional shape. Each groove 12 and 13 is adapted to receive a rubber O-ring, the unstretched inside diameter of which is slightly less than the outside diameter of the tubes to be coupled together. The rings 7 and 8 are preferably made of a special grade of synthetic rubber which is resistant to the softening action of oil and grease. The function of these rings will be explained in detail below. On either side of the central nut formation 11, the member 4 is threaded to receive the nuts or collars 5 and 6. The opposite ends of the member 4 are beveled inwardly as at 14 and 15 to act in contracting the split rings 9 and 10 into tight engagement with the tubes 1 and 2.

The securing nuts or collars 5 and 6 are provided with non-circular wrench engageable portions 16 and 17 and along the inside are threaded as at 18 and 19 to match the threads on the member 4. The nuts 5 and 6 are flanged inwardly at 20 and 21 to provide circular openings to receive the tubes 1 and 2 respectively. Inwardly of the outer faces these flanges are provided with annular beveled cam surfaces 22 and 23 which cooperate with similar and opposite cam surfaces 14 and 15 on the member 4 to cause contraction of the tube anchoring rings 9 and 10 upon tightening of the securing nuts 5 and 6.

The split rings 9 and 10 have a particular cross sectional shape as best shown in Fig. 3. The ring 10 as illustrated in Figs. 2 and 3 is a metal ring having a gap or break 24 therein so that it may be contracted to take a secure grip on the tube and thus effect a mechanical holding or locking action. On the inside edge or rim the ring 10 is grooved circumferentially as at 25. This groove provides an annular planar surface 26 extending at a right angle to the central axis of the ring and a cylindrical surface 27 extending parallel to the central axis. The ring is made of metal, such as tempered steel, having considerable hardness as well as resilience so that when the coupling is tightened the ring will not take a permanent set but will spring back to its original size and shape upon loosening of the securing nut. Considering Fig. 1 it will be seen that when the nuts 5 and 6 are tightened to the positions shown, the cam surfaces 14, 22 and 15, 23 cause contraction of the split rings 9 and 10. This contraction in turn causes the annular projections bounded on one side by the groove surfaces 26 to be forced into the tube walls sufficiently to prevent endwise removal of the tubes. As will be obvious, a large degree of fluid pressure in the tubes will tend to force them out of the coupling or connector and in the present coupling this tendency is resisted by the abrupt groove surface 26 which faces in a direction toward the adjacent end of the tubular member 4 or away from the flange of the adjacent securing nut. In fact the inner edge of the ring is sharp enough to actually cut into the metal of the tube wall if the thrust becomes sufficiently high. This will in turn cause a broaching action on the tube wall to an extent sufficient to result in an increased securing effect, whereby no further endwise movement of the tube will take place. In other words the groove formation 25 of the anchoring ring provides a sort of annular spur or cutting edge which is adapted to dig into the tube wall if the thrust becomes great enough. The groove surface 27 of cylindrical shape acts to limit the extent of penetration or indentation of the ring both upon being tightened by the action of the opposite cam surfaces and during any subsequent broaching action which ensues due to high fluid pressure in the tubes and coupling. The flat annular groove surface 26 which by its juncture with the inner surface of the ring 10 forms an indenting and cutting edge is preferably coincident with respect to the medial plane of the ring. Because this edge is adapted to effect a positive holding action on the tube, the present tube coupling is not dependent on mere frictional gripping action to hold the tubes in place. Furthermore the ring-type of holding means as disclosed is compact and results in a coupling having a minimum overall length.

The tube coupling must also be made fluid tight if the tubes and coupling are to contain fluid at high pressures. This fluid sealing function is performed by the rubber O-rings 7 and 8 contained in the annular grooves 12 and 13. The grooves are made of such depth that the rings are slightly compressed when the tubes 1 and 2 are inserted into the coupling. Then when pressure is developed within the tubes, as for instance by compressed air, the air leaks along the outside of the tubes and fills the grooves 12 and 13 on one side of the O-rings. Now the O-rings are forced tightly against the outer side of the grooves 12 and 13 and into any crevice existing between the coupling member 4 and the tubes 1 and 2. This sealing action is well known in the prior art, as shown for instance in Seamark Patent No. 2,346,051 or Wolfram and Maky Patent No. 2,412,664. In the present application the novelty resides in the mechanical tube anchoring means including a split ring, although the rubber sealing rings are necessary to provide a complete tube coupling.

For purposes of illustration the present tube coupling is illustrated as a means to couple together two tubes or pipes 1 and 2. However the same device may be used to couple a single tube or even a plurality of tubes to a fitting, valve or any fluid pressure operated device. The only difference there would be in that the tubular member 4 would then be integrally connected to such a fitting or other device meant to carry fluid pressure. In tightening the tube coupling of Fig. 1 the nuts 5 and 6 may be tightened at the same time since they preferably have similar threads, that is both right hand or both left hand. If desired the tubular member 4 may be held stationary with a wrench and each nut tightened separately.

The embodiments of the invention herein shown and described are to be regarded as illustrative only and it is to be understood that the invention is susceptible to variations, modifications and changes within the scope of the appended claims.

I claim:

1. A tube coupling device comprising, a tubular member having an inside diameter substantially equal to the outside diameter of a tube adapted for insertion therein, one end of said tubular member being beveled inwardly to provide a first cam surface and said one end also being threaded along the outer surface therof, a securing nut engageable over said threaded outer end surface of said tubular member and including an annular end flange extending inwardly beyond said one end of said tubular member, said flange being beveled on the inner side thereof to provide a second cam surface opposite to and spaced from said first cam surface, a split ring seated in the space between said cam surfaces and adapted to be contracted by said opposite cam surfaces upon tightening of said securing nut to tightly engage said tube, said ring being of circular transverse cross section except for an internal groove around its inner edge, said groove having one annular wall parallel to the central axis of said ring and having an adjacent annular wall perpendicular to said central axis, coincident with the medial plane of said ring and facing toward said one end of said tubular member.

2. A locking ring for use in a tube coupling comprising, a circular ring of solid cross section having a gap at one point in its circumference, said ring being made of a hard metal and having sufficient resilience to resist taking a permanent set when contracted to close said gap, said ring being of circular transverse cross section except for an internal groove around its inner edge, said groove having one annular wall parallel to the central axis of said ring and having an adjacent annular wall perpendicular to said central axis, coincident with said medial plane of said ring and meeting the rounded inner edge of said ring to form an annular cutting edge adapted to indent the outer surface of a tube to be locked against removal thereby upon contraction of said ring.

3. A tube coupling device comprising, a tubular member having an inside diameter substantially equal to the outside diameter of a tube adapted for insertion therein, one end of said tubular member being beveled inwardly to provide a first annular cam surface and said one end also being threaded along the outer cylindrical surface thereof, a securing nut engageable over said threaded outer end surface and including an annular end flange extending inwardly beyond said one end of said tubular member, said flange being beveled on the side adjacent to said one end of said tubular member to provide a second annular cam surface spaced from said first cam surface and sloping away from said one end of said tubular member, a split ring seated in the space between said first and second annular cam surfaces and adapted to be contracted by said cam surfaces upon tightening of said securing nut to cause said ring to tightly engage said tube, said ring being of circular transverse cross section throughout its circumference except for an internal groove around its inner circular edge, said groove having only two intersecting annular walls one of which is perpendicular to the central axis of said ring, coincident with the medial plane of said ring and facing toward said one end of said tubular member, and the other of said annular walls extending parallel to the central axis of said ring, intersecting said one wall at the circle of greatest diameter thereof and forming a stop surface to limit the extent of indentation of the outer surface of said tube by the inner circular edge of said ring upon tightening action by said securing nut.

THOMAS M. FASON.

REFERENCES CITED

The following references are of record in the file of this patent:

UNITED STATES PATENTS

| Number | Name | Date |
| --- | --- | --- |
| 1,063,926 | Schuermann | June 3, 1913 |
| 1,809,582 | Church | June 9, 1931 |
| 1,959,607 | Anderson | May 22, 1934 |
| 2,020,554 | Johnson | Nov. 12, 1935 |
| 2,232,513 | Confer | Feb. 18, 1941 |
| 2,452,275 | Woodling | Oct. 26, 1948 |